United States Patent
Wagner-Stuerz

(10) Patent No.: US 10,928,812 B2
(45) Date of Patent: Feb. 23, 2021

(54) DIAGNOSTIC METHOD FOR A POSITIONING DEVICE AND POSITIONING DEVICE WITH A DIAGNOSTIC DEVICE

(71) Applicant: SAMSON AKTIENGESELLSCHAFT, Frankfurt (DE)

(72) Inventor: David Wagner-Stuerz, Mühltal (DE)

(73) Assignee: SAMSON AKTIENGESELLSCHAFT, Frankfurt (DE)

( * ) Notice: Subject to any disclaimer, the term of this patent is extended or adjusted under 35 U.S.C. 154(b) by 218 days.

(21) Appl. No.: 16/164,135

(22) Filed: Oct. 18, 2018

(65) Prior Publication Data

US 2019/0113910 A1 Apr. 18, 2019

(30) Foreign Application Priority Data

Oct. 18, 2017 (DE) .................. 10 2017 124 293

(51) Int. Cl.
| | |
|---|---|
| *G05B 23/02* | (2006.01) |
| *F16K 37/00* | (2006.01) |
| *G05B 19/19* | (2006.01) |
| *G05B 19/418* | (2006.01) |

(52) U.S. Cl.
CPC ...... *G05B 23/0254* (2013.01); *F16K 37/0083* (2013.01); *G05B 19/19* (2013.01); *G05B 19/4184* (2013.01)

(58) Field of Classification Search
CPC ..... F16K 37/00; F16K 37/0083; G05B 19/19; G05B 19/4184; G05B 23/00–02; G05B 23/0254
See application file for complete search history.

(56) References Cited

U.S. PATENT DOCUMENTS

| | | |
|---|---|---|
| 4,888,996 A | 12/1989 | Rak et al. |
| 5,487,302 A | 1/1996 | Casada et al. |
| 5,966,679 A | 10/1999 | Snowbarger et al. |
| 2006/0060078 A1* | 3/2006 | Deller ............... F15B 19/005 91/1 |
| 2006/0217898 A1 | 9/2006 | Pemestal |
| 2011/0238329 A1* | 9/2011 | Saarinen ............ F16H 57/01 702/44 |

(Continued)

FOREIGN PATENT DOCUMENTS

| | | |
|---|---|---|
| DE | 202004020347 U1 | 6/2005 |
| DE | 102012111883 A1 | 6/2014 |

*Primary Examiner* — Nguyen Q. Ha
(74) *Attorney, Agent, or Firm* — Schiff Hardin LLP

(57) ABSTRACT

In a diagnostic method for a positioning device of a process plant, such as a chemical plant, a food processing plant or the like, which includes an actuator (e.g. pneumatic or electric actuator) with a drive shaft and a positioning armature, such as an actuator valve, with a positioning shaft, the drive shaft and the positioning shaft being connected to each other in a rotationally fixed manner (e.g. by a detachable coupling interface and/or a positive-locking torque coupling, such as a claw coupling), wherein a first measurement signal is detected during a movement of the drive shaft, and the first measurement signal or a derivative of the first measurement signal is evaluated with respect to a step-like change in order to detect a rotational backlash.

19 Claims, 3 Drawing Sheets

(56) References Cited

U.S. PATENT DOCUMENTS

Figure 1:
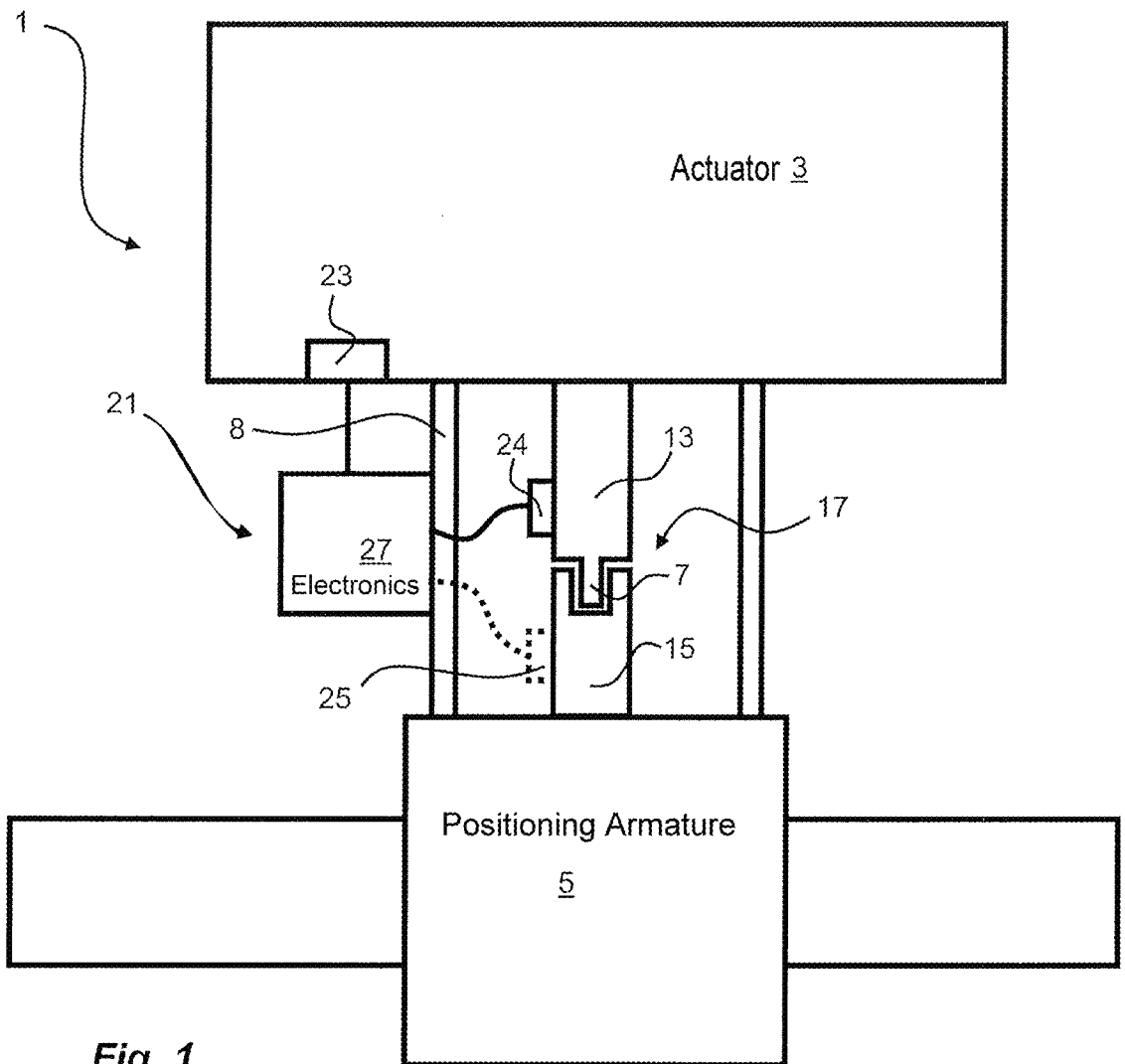

| | | | |
|---|---|---|---|
| 2013/0221250 A1* | 8/2013 | Judge | E21B 33/063 251/1.3 |
| 2014/0039666 A1* | 2/2014 | Kim | B23Q 5/56 700/174 |
| 2014/0299040 A1* | 10/2014 | Labat | G01B 3/48 116/201 |
| 2020/0096132 A1* | 3/2020 | Fassbender | F15B 15/065 |

* cited by examiner

DIAGNOSTIC METHOD FOR A POSITIONING DEVICE AND POSITIONING DEVICE WITH A DIAGNOSTIC DEVICE

CROSS REFERENCE TO RELATED APPLICATIONS

This patent application claims priority to German Patent Application No. 10 2017 124 293.7, filed Oct. 18, 2017, which is incorporated herein by reference in its entirety.

BACKGROUND

The disclosure relates to a diagnostic method for a positioning device of a process plant, such as a power plant, for example a nuclear power plant, a chemical plant, for example a petrochemical plant, a food processing plant or the like. The disclosure also relates to a positioning device for a process plant, which comprises an actuator, a positioning armature, a rotary joint, such as a positive-locking torque coupling, for example a claw coupling, for connecting a drive shaft to a positioning shaft, and a diagnostic device. The diagnostic method can be used to detect a backlash in the positive-locking torque coupling. The diagnostic device can be arranged to perform a diagnostic method to detect rotational backlash of the rotary joint.

DE 20 2004 020 347 U1 describes a pneumatic swivel drive for positioning a control element, such as a valve, with a drive shaft that is detachably coupled to an actuator shaft of the control element via a coupling interface. The pneumatic swivel drive has a sensor system with a first displacement sensor to detect the position of the drive shaft and a second displacement sensor to detect the position of the actuator shaft. The first and second sensors are connected to a device for comparing the sensor signals. The pneumatic swivel drive also has a device for interpreting and evaluating the comparison signal from the comparator, for example to detect an angular difference between the drive shaft and the actuator shaft. In this way, typical and untypical wear conditions of the actuator can be identified. According to DE 20 2004 020 347 U1, there may be mechanical backlash in the coupling interface between the drive shaft and the actuator shaft. As a result of the backlash, an opening actuator movement of the drive shaft, for example, is only transmitted to the actuator shaft after a time difference. After the mechanical backlash has been overcome, the angular position of the driven actuator shaft changes according to the drive shaft. The angular positions then run essentially parallel to each other, with a slight divergence resulting from elastic deformation of the actuator shaft, drive shaft and coupling interface between the first and second sensor. The time delay or divergence can be compared with an experience and setpoint value, whereby if the setpoint difference is exceeded by a measured actual difference, a warning signal can be issued to indicate impermissible wear of the coupling connection. As described in DE 20 2004 020 347 U1, there is always a risk that one of the angular position sensors will not operate properly. In this case, no reliable statement can be made about the backlash or other possible malfunctions of the pneumatic swivel drive. The reliability of the system is limited due to the use of a large number of components (an interpreter and/or evaluation device, a comparator and two displacement sensors), as each individual component represents a potential source of error whose individual failure causes the entire diagnostic sensor system to fail. Especially in safety-critical applications, for example in nuclear power plants, this represents a safety risk. If only one component fails, the affected control element must be taken out of operation and repaired, which disrupts the process controlled by the control element.

BRIEF DESCRIPTION OF THE DRAWINGS/FIGURES

The accompanying drawings, which are incorporated herein and form a part of the specification, illustrate the embodiments of the present disclosure and, together with the description, further serve to explain the principles of the embodiments and to enable a person skilled in the pertinent art to make and use the embodiments.

Figure 2:
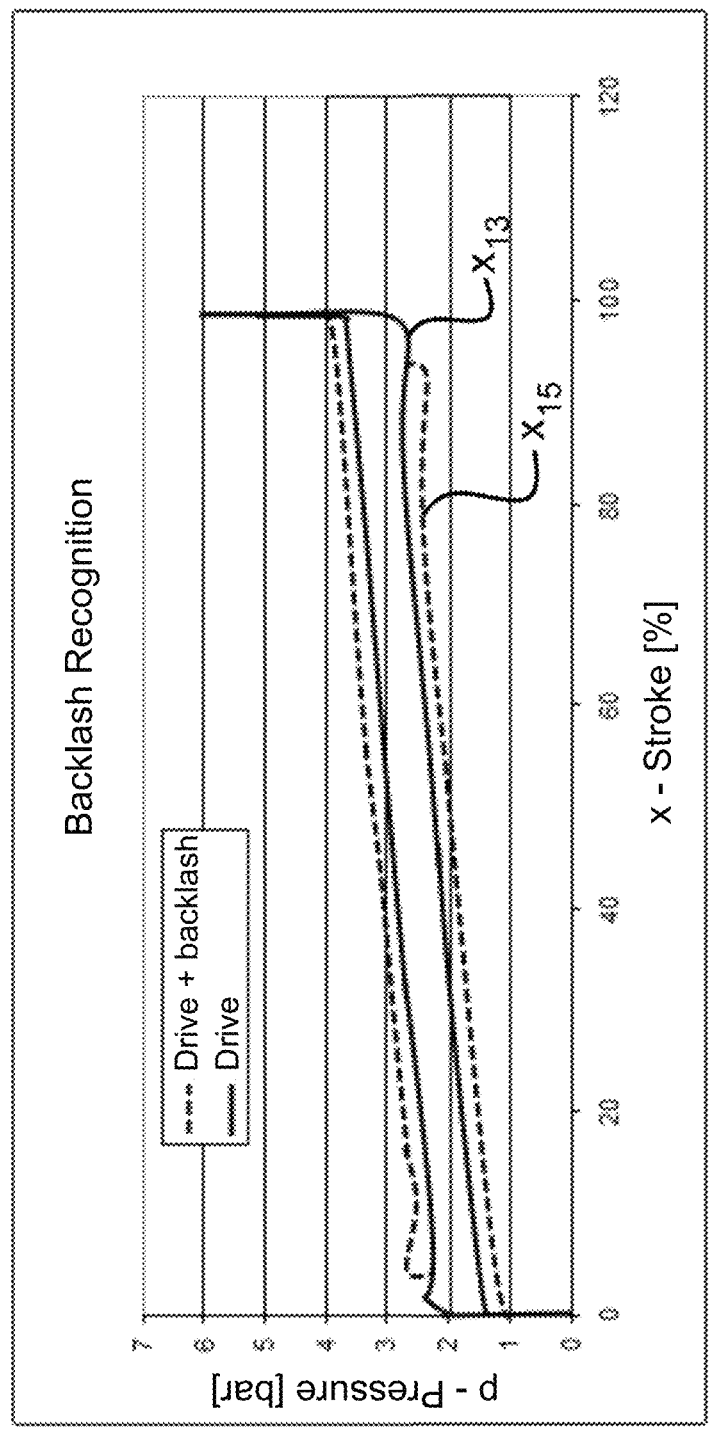
Figure 3:
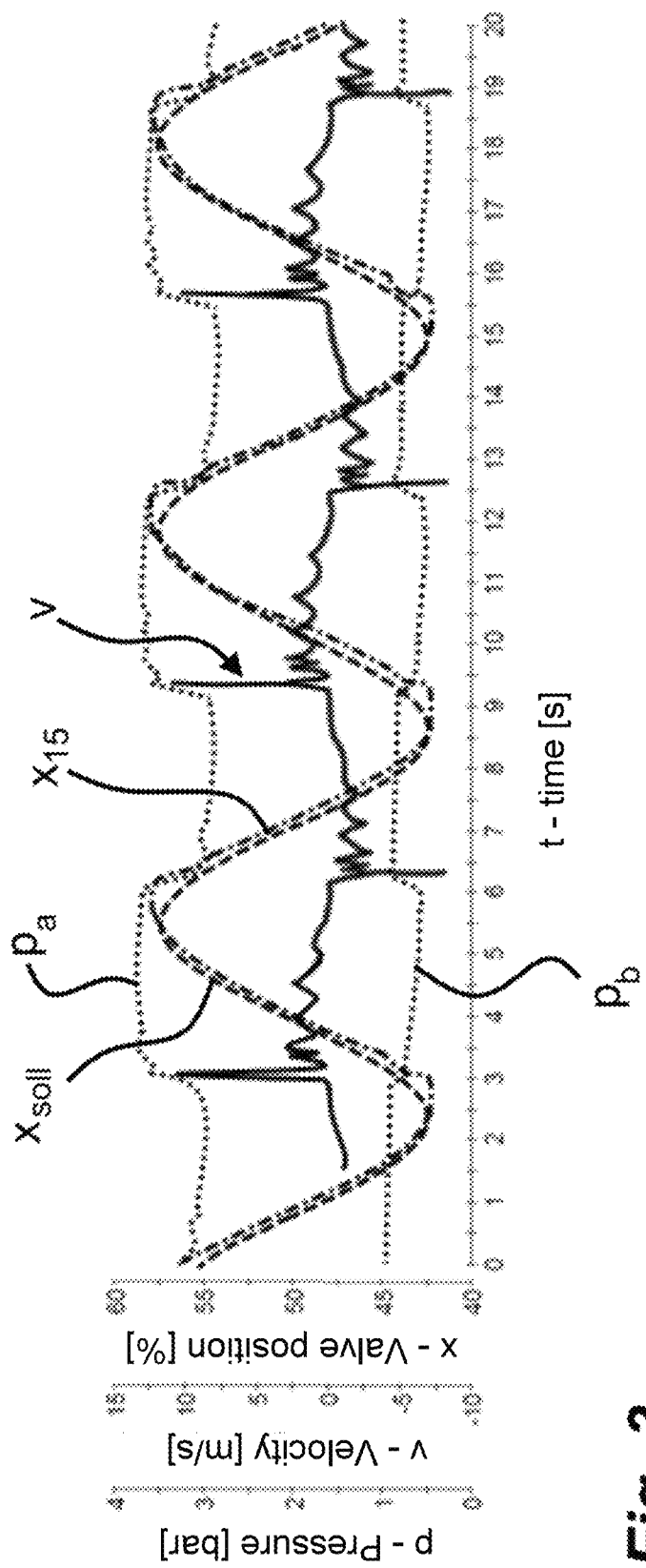

FIG. 1: illustrates a schematic representation of a positioning device according to an exemplary embodiment of the disclosure;

FIG. 2: illustrates a drive pressure/stroke-diagram concerning the driving positioning rod according to an exemplary embodiment of the disclosure; and FIG. 3: illustrates a time-diagram of the nominal stroke and various measured values of a positioning device according to an exemplary embodiment of the disclosure.

The exemplary embodiments of the present disclosure will be described with reference to the accompanying drawings. In the drawings, the same or similar reference signs are used for identical or similar components.

DETAILED DESCRIPTION

In the following description, numerous specific details are set forth in order to provide a thorough understanding of the embodiments of the present disclosure. However, it will be apparent to those skilled in the art that the embodiments, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring embodiments of the disclosure.

An object of the disclosure is to provide a diagnostic method for a positioning device and/or a positioning device with a diagnostic device, with which a reliable statement can be made about the backlash at the torque coupling, whereby the complexity of the diagnostic method or the positioning device is reduced and/or whereby a statement about the backlash can be made independently of the presence and condition of a displacement sensor.

Accordingly, in an exemplary embodiment, a diagnostic method is provided for a positioning device of a process plant, such as a power plant, for example a nuclear power plant, a chemical plant, for example a petrochemical plant, a food processing plant or the like. The diagnostic method according to an exemplary embodiment of the disclosure is intended for a positioning device which comprises an actuator with a drive shaft and a positioning armature with a positioning shaft, whereby the drive shaft and the positioning shaft are connected to each other in a rotationally fixed manner. In an exemplary embodiment, the rotationally fixed connection between the drive shaft and the positioning shaft is a detachable coupling using a coupling interface. In an exemplary embodiment, the rotationally fixed connection is a positive-locking torque coupling. In an exemplary embodiment, the actuator of the positioning device is pneumatic or electric, for example. A positioning armature is particularly suitable as an actuator valve. An actuator valve can, for example, comprise a rotatable valve element arranged in a valve channel in order to allow or prevent the flow of a process fluid to the process plant. For this purpose, the actuator valve can, for example, be designed and operated as an on/off valve. It is also possible for the actuator valve to take up different positions between a fully open position and a fully closed position in which, depending on the position of the actuator valve, a flow resistance is applied to the process fluid. For example, an actuator valve may have a range of 360° or less. A control range of 180° or less or 90° or less may be preferred. For example, a positioning device can completely release a flow cross-section at a first (open position) and completely close the flow cross-section of the actuator valve at a second (closed position), which is preferably turned 90° relative to the first (open position). Such an actuator valve can, for example, be realized as a so-called butterfly valve.

The rotationally fixed connection between the drive shaft and the positioning shaft can be detachable, non-detachable, switchable or non-switchable. In particular, the connection can be realized as a claw coupling. A claw coupling can, for example, be realized by complementary, crown-like shaft ends of the positioning shaft and the drive shaft, which engage in each other for the transmission of torques and/or rotational forces. Other rotary connections are conceivable, for example a Schmidt-Kupplung, an Oldham coupling, a universal joint, a ball synchronizer joint, a curved-tooth coupling or the like. It is conceivable that the rotary connection is realized by a switchable claw coupling or a switchable tooth coupling. The rotary connection is designed to transmit rotary positioning movements and/or positioning forces from the drive shaft to the positioning shaft. The rotary connection between the positioning shaft and the drive shaft is preferably designed without transmission or reduction ratio (i.e. rotary motion or torque is transmitted from the drive shaft to the positioning shaft by the rotary connection in a ratio of 1:1).

In an exemplary embodiment of the diagnostic method, a first measurement signal is acquired during a movement of the drive shaft, for example a displacement measurement signal relating to the rotational movement of the drive shaft. In an exemplary embodiment, the first measuring signal or a derivative of the first measuring signal is evaluated with regard to a step-like change in order to detect a rotational backlash. Advantageously, the inventors have found out that a sudden change in sensor measured values can be used to reliably and precisely detect the backlash of the actuator, particularly of a rotary connection of a drive shaft and a positioning shaft, for example a detachable coupling interface and/or a positive torque coupling, such as a claw coupling.

In an exemplary embodiment, the first measurement signal is a pressure measurement signal relating in particular to a pneumatic or hydraulic drive pressure or a pressure measurement signal relating in particular to a signal pressure at the positioning armature. A pressure measurement signal can, for example, refer to the drive pressure in a drive chamber of a pneumatic or hydraulic actuator. Such an actuator can, for example, have a single-acting design, i.e. a pneumatic working chamber, and an opposite return spring. It is also conceivable that the actuator may have two oppositely acting working chambers; such an actuator can be described as a double-acting pneumatic or hydraulic actuator. Particularly with a double-acting actuator, the pressure measurement signal can refer to a pressure difference between the working chambers. In general, a pressure measurement signal can refer to the pressure difference between the pneumatic or hydraulic drive pressure in a working chamber of the actuator and a reference pressure, especially the atmospheric pressure. The pressure measuring signal can refer to a pressure difference at the positioning element, for example the valve element, in particular to a pressure difference in the process fluid upstream and downstream of the positioning element. Such an embodiment of the diagnostic method according to the disclosure makes it possible to qualitatively detect a backlash between the two shafts on the basis of a pressure measuring signal, which is often measured anyway, for example, with a pneumatic or hydraulically actuated actuator, even without measuring the distance or speed of the drive shaft or the positioning shaft. An additional displacement sensor can then be dispensed with.

In an exemplary embodiment of the disclosure, the first measuring signal is a position measuring signal or a velocity measuring signal. The position measurement signal or velocity measurement signal can refer to a relative position or relative velocity of the drive shaft with respect to a fixed differential point. The position measurement signal or velocity measurement signal can refer to a relative position or relative velocity of the positioning shaft with respect to a fixed reference point. Especially in comparison to the pneumatic swivel drive according to DE 20 2004 020 347 U1, according to this embodiment of the disclosure, the use of only one position or velocity sensor, which can refer either to the drive shaft or to the positioning shaft, is advantageously sufficient to detect the backlash between the drive shaft and the positioning shaft. The respective other sensor and the comparison device, which is necessary in the prior art, can be advantageously omitted according to one or more of the exemplary embodiments of the diagnostic method.

In a diagnostic method according to an exemplary embodiment of the disclosure, the first measurement signal is a force measurement signal, a torque measurement signal or an acceleration measurement signal. If there is a circumferential backlash between the drive shaft and the positioning shaft, only the drive shaft is actuated when the actuator is initially actuated, and only after the circumferential backlash has been overcome is the positioning shaft with the positioning element attached additionally actuated, so that at the moment when the circumferential backlash has been overcome a noticeable, abrupt increase in the actuating force or torque occurs in order to overcome the additional resistances acting on the positioning shaft. On the other hand, a sensor referring to the positioning shaft does not detect any actuating force or torque as long as the drive shaft has not overcome the backlash and has not engaged the positioning shaft. From this point on, the actuating force provided to the positioning shaft or the actuating torque increases abruptly. The drive shaft is first braked when it comes into contact with the positioning shaft, so that an acceleration sensor can detect a negative acceleration. The positioning shaft is suddenly accelerated by the drive shaft after the backlash has been overcome. The use of a force, torque or acceleration measurement signal can be particularly advantageous if, for example, a positioning device is already equipped with a force-torque and/or acceleration sensor for overload protection.

In an exemplary embodiment of a diagnostic method, the measuring signal is additionally or alternatively an optical or acoustic measuring signal.

In an exemplary embodiment, the acoustic sensor is configured to detect an acoustic measuring signal or the impact of a collision when a contact surface on the drive shaft side and a contact surface coupling interface on the positioning shaft side of a claw coupling, for example, come into contact after a backlash has been overcome. The gap associated with the backlash or its occurrence/disappearance can also be detected optically. With such a measurement, which directly detects the presence or disappearance of a rotary clearance, a rotary clearance can be reliably detected.

According to an embodiment of an inventive diagnostic method that can be combined with one or more of the previous embodiments, the first measuring signal is detected with a sensor directed towards the drive shaft or with a sensor directed towards the positioning shaft. As shown above, a sensor directed towards the drive shaft in the direction of overcoming backlash can detect directly or indirectly the abrupt increase in the resistance acting against the actuator through the drive shaft. A sensor directed towards the positioning shaft can detect the overcoming of the backlash and the influencing of the positioning shaft by the actuator starting from this moment. Alternatively, it is conceivable to design a diagnostic method according to the disclosure, in which the measuring signal is detected by a sensor directed to the rotationally fixed connection, in particular the torque coupling.

According to an embodiment of an inventive diagnostic method which can be combined with one or more of the previously discussed embodiments, during the movement of the drive shaft the time, a setpoint control signal, an electrical control signal and/or a (different) second measurement signal is acquired which refers to a different physical quantity than the first measurement signal. In this embodiment of a diagnostic method, for example, a second measurement signal, a third measurement signal and/or a fourth measurement signal relating to different physical quantities such as displacement, force, drive pressure or the like can be taken into account in order to increase precision and reliability, in order to ensure particularly accurate detection of backlash. In contrast to DE 20 2004 020 347 U1, the diagnostic method for detecting a rotational clearance according to an exemplary embodiment does not include the detection and comparison of two measured variables related to the same physical quantity, such as displacement or speed.

According to an exemplary embodiment of a diagnostic method, which can be combined with one or more of the other exemplary embodiments described herein, the derivative of the first measurement signal is related to time and/or to another physical quantity recorded, for example, as a second measurement signal. It is also conceivable to relate the derivative of the second, third or further measurement signal to another physical quantity or to time. For example, the first measurement signal can be a position measurement signal whose first derivative after time is a velocity signal and whose second derivative after time is an acceleration signal. If such a position measurement signal refers to the position of the drive shaft, this rotational backlash can be detected at the moment when a rotational backlash between the drive shaft and the positioning shaft is overcome by means of a possibly brief persistence in a position, by means of a drop in velocity and/or by means of a pulse-like deceleration or negative acceleration. It is also conceivable that the first measured variable is a drive pressure measuring signal and the second measured variable is an actuator shaft position signal, on the basis of which a derivative of the actuator pressure can be determined after the position, whereby it can be concluded that a backlash has been overcome with a rapidly increasing pressure depending on the position.

In accordance with an embodiment of a diagnostic method which can be combined with one or more embodiments described herein, the amplitude of the backlash is determined by taking into account the first, possibly the second and/or a further measurement signal, which can be a position measurement signal, a velocity measurement signal or an acceleration measurement signal, which can in particular be detected by a sensor directed towards the drive shaft or by a sensor directed towards the positioning shaft. On the basis of a position measurement signal, the amplitude of the rotary backlash can be calculated directly from the position measurement values at the beginning and end of the rotary backlash, taking into account a previously performed detection of the rotary backlash, in particular the start or the end of the rotary backlash. If a velocity and/or acceleration sensor is used as the sensor, a travel amplitude of the backlash can also be determined using a time integral of the velocity or a double time integral of the acceleration. When the drive shaft and the actuator shaft move from a first end position to a second end position and back again if necessary, the amplitude of the backlash can be determined on the basis of a hysteresis of the detected first, second and/or further measurement signal occurring as a result of the backlash.

According to an embodiment of a diagnostic method that can be combined with one or more embodiments described herein, a warning signal is generated when a predetermined threshold value is exceeded by the first or second measurement signal and/or a determined backlash amplitude. For example, a threshold value can be defined in such a way that a user is notified when the diagnostic method has determined that the positioning device has a backlash that still permits safe operation but is approaching a critical level. In particular, a threshold value can be defined in such a way that a warning signal is generated when a critical value is reached.

According to an embodiment of a diagnostic method according to the disclosure, which can be combined with one or more embodiments described herein, the method also includes a stroke test, such as a partial stroke test or a full stroke test. The prior detection and, where appropriate, amplitude determination of the backlash between the drive shaft and the positioning shaft can be used to define the amplitude of a partial stroke test in order to make a valid statement or to ensure that there is no significant falsification of the diagnostic result at a predetermined partial stroke test amplitude present as a result of any rotary play.

The disclosure also relates to a positioning device for a process plant, such as a chemical plant, for example a petrochemical plant, a food processing plant, for example a brewery, a power plant, for example a nuclear power plant, or the like. In an exemplary embodiment, the positioning device comprises an actuator, in particular a pneumatic or electric actuator, with a drive shaft, and a positioning armature, such as an actuator valve, with a positioning shaft. The positioning device also comprises a rotationally fixed connection, in particular a positive-locking torque coupling, such as a claw coupling, which connects the drive shaft and the positioning shaft. The positioning device also includes a diagnostic device comprising a first sensor and diagnostic electronics connected to the first sensor to receive a first measurement signal from the first sensor. The diagnostic device can also be referred to as a detector in one or more embodiments. The diagnostic electronics of the diagnostic device are arranged to evaluate the first measurement signal or a derivative of the first measurement signal for a sudden change in order to detect a rotational backlash. In an exemplary embodiment, the detection concerns the backlash between the drive shaft and the positioning shaft, especially in the rotationally fixed connection, for example the claw coupling. The first sensor can, for example, be a pressure sensor, in particular a pressure sensor that is related to a pneumatic or hydraulic actuator in order, for example, to measure the signal pressure or a signal pressure difference. The first sensor can be a position sensor that detects the position of the drive shaft. In an exemplary embodiment, the first sensor is a speed sensor, a force sensor, a torque sensor, and/or an acceleration sensor, or the like. For example, the first sensor can be an optical or an acoustic sensor. It is also conceivable that the first sensor is an electrical sensor, a magnetic sensor, an electromagnetic sensor, or the like.

According to an exemplary embodiment of a positioning device, the first sensor is directed towards the drive shaft, to the positioning shaft and/or to the rotationally fixed connection, in particular the torque coupling.

According to an exemplary embodiment of an inventive positioning device, the diagnostic device further comprises at least one second, third and fourth and/or further sensor connected to the diagnostic electronics, which measures a different physical quantity than the aforementioned first sensor. The second sensor (or others) connected to the diagnostic electronics may be, for example, a position sensor or a speed sensor. In an exemplary embodiment, the second or other additional sensor(s) for transmitting the second or other additional measurement signal(s) is connected to the diagnostic electronics.

In accordance with an embodiment of the positioning device, which can be combined with one or more of the embodiments described herein, the diagnostic device also includes a device connected to the diagnostic electronics for acquiring a setpoint control signal or an electrical control signal. A setpoint control signal can, for example, be a signal specified by a control room with respect to a setpoint position of the positioning element of the positioning armature. Usually, a positioning element is connected to the positioning shaft in a rotationally fixed manner. A setpoint control signal can, for example, be a setpoint angle or a setpoint control position, such as an open or closed position. An electrical control signal can, for example, be the electrical control signal received at the positioning device from a control room or a central control point, which transmits a control specification to the positioning device.

In accordance with an embodiment of the positioning device which can be combined with one or more of the embodiments described herein, the diagnostic electronics is configured to determine the derivative of the first measurement signal (as well as optionally a second and third and/or a further measurement signal) with respect to the other physical quantity or the time. For example, in an embodiment, the diagnostic electronics includes a first sensor for sensing a first measurement signal related to the drive pressure of a pneumatic actuator and a second sensor for sensing a second measurement signal related to a position of the drive shaft, and the diagnostic electronics may be arranged to determine a derivative of the pressure signal from the first sensor related to the travel sensed by the second sensor. The diagnostic electronics may include a timing device such as a timer. In an exemplary embodiment, the diagnostic device is configured to interrogate, analyze, process, and/or store the measured values at certain specified intervals, e.g. according to a clocking, whereby such a clocking can define a time unit. In an exemplary embodiment, the diagnostic electronics is configured to determine the derivation of the first measurement signal with respect to time, whereby a time derivation of the first measurement signal can take place according to measured time values or points in time or according to specified time units.

In accordance with an embodiment of a positioning device according to the disclosure which can be combined with one or more embodiments described herein, the diagnostic device comprises a position sensor, a speed sensor and/or an acceleration sensor which is directed in particular towards the positioning shaft or the drive shaft. In an exemplary embodiment, the diagnostic electronics is configured to receive the measurement signal from this sensor, i.e. the position sensor, the speed sensor and/or the acceleration sensor, and to take it into account to determine the amplitude of the backlash. A quantitative determination of the amplitude of the backlash in itself allows a reliable statement about wear and tear on the positioning device, in particular its rotationally fixed connection, e.g. a claw coupling, and can improve the reliability of further tests, e.g. a partial stroke test and/or a full stroke test.

In an exemplary embodiment, the positioning device is configured to perform a diagnostic method according to one or more aspects of the disclosure. In an exemplary embodiment, the diagnostic method is performed with a positioning device according to the disclosure and/or uses the components of a positioning device according to the disclosure. The diagnostic method according to the disclosure can function according to the functionality of a positioning device according to the disclosure.

In an aspect, the idea of the diagnostic method according to the disclosure consists in the fact that in the case of a rotary connection between a drive shaft and a positioning shaft, exemplarily a claw coupling, in the case of the presence of a rotary backlash, starting from a rest state, e.g. a closed state of the actuator valve, in the case of an initial movement of the drive shaft contrary to its previous drive movement for setting the positioning element, e.g. into the end position, the claw on the drive shaft side must first overcome the rotary backlash, before contact is again made between the claw on the drive side and the claw on the output side or positioning shaft side. While the drive shaft overcomes the backlash, the actuator only has to overcome frictional resistances etc. which act directly on the drive shaft. Only from the moment the claw on the drive shaft side comes into contact with the claw on the positioning shaft side does the actuator (also) work against the resistances acting on the positioning shaft, such as friction on seals and friction or settlement on the valve element. At the moment the contact is made, the resistance that the actuator must overcome increases noticeably, which results in a sudden change, for example in the rotational speed, i.e. a sudden deceleration. If the actuator is pneumatically actuated, increasing the drive power to actuate both the drive shaft and the positioning shaft requires a noticeable increase in the pneumatic drive pressure.

FIG. 1 shows a positioning device according to an exemplary embodiment of the disclosure, which is generally provided with the reference number 1. In an exemplary embodiment, the positioning device 1 includes an actuator 3 equipped with a drive shaft 13 for outputting the drive power, a positioning armature 5 equipped with a positioning shaft 15 for receiving the drive power from the actuator 3, and a rotationally fixed connection 17 for transmitting the drive power from the drive shaft 13 to the positioning shaft 15. For example, the actuator 3 is designed as a pneumatic single-acting or double-acting actuator. The positioning armature 5 can be a butterfly valve type actuator valve. The drive shaft 13 and the positioning shaft 15 can be connected to each other by means of a claw coupling 7 in an exemplary embodiment.

In an exemplary embodiment, the positioning device 1 includes a diagnostic device 21 with diagnostic electronics 27 and at least one first sensor. In addition to the first sensor, the diagnostic device 21 may include a second, third, fourth or further sensor. The diagnostic device 21 can also be referred to as detector 21 in one or more embodiments. In an exemplary embodiment, the detector 21 includes processor circuitry that is configured to perform one or more operations and/or functions of the detector 21, including, for example, one or more sensing operations.

In an exemplary embodiment, diagnostic device 21, which is shown in FIG. 1, has, for example, an actuator pressure sensor 23 for detecting the pneumatic drive pressure in a working chamber of the actuator 3. In an exemplary embodiment, the diagnostic device 21 according to FIG. 1 also has a displacement sensor and/or position sensor 24 in relation to the drive shaft 13, which detects a position and/or a displacement of the drive shaft 13 in relation to a fixed reference point. Such a reference point can, for example, be predetermined by the actuator 3 and/or the positioning armature 5 and/or a housing or yoke 8 or similar, which is permanently connected to the actuator 3 and the positioning armature 5. In an exemplary embodiment, the diagnostic device 21 also includes a further sensor 25 on the positioning shaft 15, for example a velocity or acceleration sensor.

In an exemplary embodiment, the diagnostic device 21 of a positioning device 1 includes at least one positioning device-related sensor. The positioning device-related sensor records or otherwise senses/determines a measured variable that can be related to the drive shaft, the positioning shaft or the rotationally fixed connection 17, for example a travel, a variable that can be related to the actuator 3 or the positioning armature 5, for example a pressure measured value, or a measured value that is generally related to the positioning device 1, for example an acoustic measurement.

In an exemplary embodiment, alternatively or additionally, positioning device 1 or its diagnostic device includes other or additional sensors. Other sensors can refer to the drive shaft 13, the positioning shaft 15, and/or the rotationally fixed connection 17, for example (not shown). In an exemplary embodiment, the diagnostic device does not have a sensor 24 related to the drive shaft 13 and/or an actuator pressure sensor 23, but only another sensor 25 related, for example, to the positioning shaft 15, such as a displacement, acceleration or velocity sensor.

In an exemplary embodiment, the diagnostic device 21 includes sensors configured to measure or otherwise sense pressure and to generate a corresponding a pressure measuring signal. For example, the pressure sensor(s) can determine a hydraulic or pneumatic drive pressure, and/or a pressure signal relating to a positioning pressure, for example at the positioning armature. In an exemplary embodiment, the diagnostic device 21 includes a sensor system to sense and generate a corresponding speed measurement signal, a force measurement signal, a torque or an acceleration measurement signal. In an exemplary embodiment, the diagnostic device 21 is connected with an optical sensor and/or an acoustic sensor for the collection of an optical measuring signal and acoustic measuring signal, respectively. The sensor may be electromechanical to provide an electromechanical measurement signal to the diagnostic device 21 in on or more aspects.

In an exemplary embodiment, the sensor or sensors of the diagnostic device 21 are connected to the diagnostic electronics 27 according to one or more wired and/or wireless signal transmission protocols. In an exemplary embodiment, the diagnostic device 21 includes a time measuring device and/or a timer. For example, the diagnostic electronics 27 can be equipped with a timer.

In an exemplary embodiment, the diagnostic device 21 or its diagnostic electronics 27 can also be equipped with one or more signal inputs for recording, for example, a setpoint positioning signal $x_{soll}$ or an electrical control signal. For example, the actuator can be equipped with a current/pressure converter (i/p converter) for the compressed air supply of the pneumatic actuator and the diagnostic electronics 27 can receive the electrical control signal or the setpoint control signal, which is specified for the electropneumatic conversion. Diagnostic electronics 27 can be part of positioner electronics. In an exemplary embodiment, the diagnostic electronics 27 include processor circuitry that is configured to perform one or more operations and/or functions of the diagnostic electronics 27, including, for example, recording, storing, processing, and/or analyzing one or more input signals and/or generating an output signal (e.g. control signal) based on, for example, the input signal (s).

FIG. 2 shows a schematic drive pressure/stroke diagram according to an exemplary embodiment, where for a so-called full stroke test the stroke position $x_{13}$ of the drive shaft 13 without backlash and the stroke position $x_{15}$ of the positioning shaft 15 with backlash are plotted as a percentage of the total travel relative to the drive pressure $p_a$ for a so-called full stroke test.

Regarding the full stroke test, the complete movement range of the positioning element (e.g. the valve element) of a positioning armature (e.g. an actuator valve) from a first end position (e.g. a fully closed end position) to a second end position (e.g. a fully open end position), i.e. 100% of the travel, is traversed. The full stroke test shown in FIG. 2 can be performed for positioning device initialization. As a result of a backlash in the rotationally fixed connection 17 between the drive shaft 13 and the positioning shaft 15, the drive shaft 13 begins to move before the positioning shaft 15 moves. This is because, starting from the first end position, the drive shaft first passes through the area of backlash in which there is no force-transmitting contact between the drive shaft 13 and the positioning shaft 15. Only after the backlash has been completely passed through does the drive shaft 13 make contact with the positioning shaft 15.

For example, a claw coupling 7 can be provided as the contact of a rotationally fixed connection 17 between the drive shaft 13 and the positioning shaft 15, as shown in FIG. 1, whereby there is a certain relative movement of the claw on the actuator side relative to the claw on the positioning element side. It is also possible to use another rotary connection between the drive shaft 13 and the positioning shaft 15. Only after the drive shaft 13 has completely passed through the backlash does the drive shaft 13 take the positioning shaft 15 with it. As a result of the resistances acting on the positioning shaft 15 or the positioning element of the positioning armature 5, the contact between the actuator shaft 13 and the positioning shaft 15 is accompanied by a necessity for a correspondingly increasing drive force. The drive pressure/stroke diagram shown in FIG. 2 shows a sudden, rapid change in the drive pressure p at a constant stroke position $x_{15}$. Both when approaching from the (for example closed) 0% position, a rapid change in pressure $p_a$ occurs here as an example with a drive shaft movement of about 5% of the total travel (i.e. from the 0% stroke position to the 5% stroke position). Similarly, when moving away from the 100% stroke position (e.g. fully open), a rapid change in pressure occurs only after an initial change in position of the drive shaft 13 by about 5% of the travel (i.e. from the 100% stroke position to the 95% stroke position).

From the diagram according to FIG. 2, a sudden change in drive pressure $p_a$ can be read from the rapid change in pressure when passing through the 5% position (in the ascending direction) and when passing through the 95% position (in the descending direction). In accordance with the method according to exemplary embodiments described herein, it can be deduced from this that there is a backlash between the drive shaft 13 and the positioning shaft 15. Furthermore, from the sudden change in pressure at about 5% or 95% of the total travel, it can be deduced that the backlash is about 5% of the total travel.

For example, when initializing a positioning armature 5, in particular an actuator valve, a travel pressure line can be recorded in accordance with FIG. 2 and stored as a so-called valve signature in the diagnostic electronics, for example in the memory of a positioner. According to this example, the characteristic curve can be recorded using a rotary sensor 24 and an actuator pressure sensor 23. In an exemplary embodiment, as an alternative to the actuator pressure sensor 23, an electrical control signal, such as a current signal proportional to the signal pressure, which can be applied to an i/p converter, is detected by the diagnostic electronics 27. The pressure signature can, for example, be recorded according to the exemplary representation of FIG. 2 with a slow process from 0% stroke position to 100% stroke position, whereby the stroke position (in percent, degrees or millimeters) is recorded. If a comparable measurement (here: a full stroke test) is carried out at a later point in time during operation of the actuator, the sudden increase in the actuator pressure $p_{13}$ at constant or slightly changing position $x_{15}$ (or $x_{13}$) is used to detect the presence of backlash. If the clutch backlash detected in this way reaches a predefined threshold, a warning can be issued to the effect that, for example, positioning device 1 is no longer working sufficiently or precisely or that a full stroke test or partial stroke test can only be performed with limited accuracy.

The diagram shown in FIG. 3 shows a time (t)-dependent course of the drive pressure $p_a$ (dotted line) in a first drive chamber and the signal pressure $p_b$ (dotted line) in a second drive chamber of a double-acting pneumatic actuator according to an exemplary embodiment. FIG. 3 also shows the time-dependent course of a nominal position control signal (nominal stroke) $x_{soll}$ (dashed line) and an actual position measurement signal with respect to the positioning shaft $x_{15}$ (dotted line). FIG. 3 also shows the time-dependent course of the positioning speed v (solid line) of the positioning shaft 15. The course of the setpoint position signal $x_{soll}$ is sinusoidal with an amplitude of ±7.5% of the total positioning range around the 50% valve position. This can be regarded as a setpoint control signal for a partial stroke test around an open position.

A period of the partial stroke test is about 6.2 seconds. Both in the course of the actual measuring signals for the positioning shaft position $x_{15}$ and with respect to the positioning speed v, sudden changes can be detected at about 3.1 seconds, about 6.2 seconds, 9.4 seconds, 12.6 seconds, 15.7 seconds and 19 seconds. The actual position of the positioning shaft $x_{15}$ first follows the setpoint position $x_{soll}$ up to the lower or upper reversal point, where the actual position $x_{15}$ subsequently remains for a short time before a sudden change in the opposite direction takes place, through which the actual position $x_{15}$ again adjusts to the setpoint position $x_{soll}$. The abrupt changes in the position of the positioning shaft-actual position-measuring-signal $x_{15}$ are accompanied by an abrupt change in the positioning rod speed v due to the impact of the drive shaft against the positioning shaft or the coupling components on the drive side against the coupling components on the positioning shaft side.

The signal pressure $p_a$ of the first working chamber runs in the range of the pressure increase (at about 3.1 seconds, about 9.3 seconds and about 15.6 seconds) with a recognizable pressure peak. The pressure curve of the second pneumatic working chamber $p_b$ also shows a pressure peak in the course of the rising range (at about 6.3 seconds, about 12.6 seconds and about 19 seconds).

The sudden changes in each individual curve $x_{15}$, v, $p_a$ and $p_b$ taken in isolation as shown in FIG. 3 indicate that there is a backlash between the drive shaft 13 and the positioning shaft 15 at the positioning device on which the measured values were recorded.

Instead of the shaft position or shaft speed, for example, a completely different physical quantity can be measured, for example an acoustic measurement of the impact of the drive shaft 13 against the positioning shaft 15, in order to detect the overcoming of the backlash.

The in the foregoing description, disclosed the figures and the claims may be important for the realization of the disclosure in its various embodiments both individually and in any combination.

CONCLUSION

The aforementioned description of the specific embodiments will so fully reveal the general nature of the disclosure that others can, by applying knowledge within the skill of the art, readily modify and/or adapt for various applications such specific embodiments, without undue experimentation, and without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one embodiment," "an embodiment," "an exemplary embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The exemplary embodiments described herein are provided for illustrative purposes, and are not limiting. Other exemplary embodiments are possible, and modifications may be made to the exemplary embodiments. Therefore, the specification is not meant to limit the disclosure. Rather, the scope of the disclosure is defined only in accordance with the following claims and their equivalents.

Embodiments may be implemented in hardware (e.g., circuits), firmware, software, or any combination thereof. Embodiments may also be implemented as instructions stored on a machine-readable medium, which may be read and executed by one or more processors. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processor circuitry" shall be understood to be circuit(s), processor(s), logic, or a combination thereof. A circuit includes an analog circuit, a digital circuit, state machine logic, other structural electronic hardware, or a combination thereof. A processor includes a microprocessor, a digital signal processor (DSP), central processing unit (CPU), application-specific instruction set processor (ASIP), graphics and/or image processor, multi-core processor, or other hardware processor. The processor may be "hard-coded" with instructions to perform corresponding function(s) according to aspects described herein. Alternatively, the processor may access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary embodiments described herein, the memory is any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

REFERENCE LIST 1 positioning device
3 actuator
5 positioning armature
7 claw coupling
8 yoke
13 drive shaft
15 positioning shaft
17 rotationally fixed connection
21 diagnostic device/detector
23 actuator pressure sensor
24 rotary sensor/position sensor
25 sensor
27 diagnostic electronics
P drive pressure
t time
v positioning speed
$x_{soll}$ setpoint position positioning signal
$x_{13}$ stroke position of the drive shaft 13
$x_{15}$ stroke position of the positioning shaft 15

The invention claimed is:

1. A diagnostic method for a positioning device including an actuator having a drive shaft and a positioning armature having a positioning shaft, the drive shaft and the positioning shaft being connected to each other in a rotationally fixed manner, the method comprising:
   detecting a measurement signal during a movement of the drive shaft;
   evaluating the measurement signal or a derivative of the measurement signal with respect to a step-like change to detect a rotational backlash; and
   determining if the measurement signal exceeds a predetermined threshold value, and generating a warning signal based on the determination.

2. The diagnostic method according to claim 1, wherein the measurement signal is a pressure measurement signal with respect to a pneumatic or hydraulic drive pressure, or a pressure measurement signal with respect to a positioning pressure at the positioning armature.

3. The diagnostic method according to claim 1, wherein the measurement signal is:
   a position measurement signal or a velocity measurement signal,
   a force, torque or acceleration measurement signal, or
   an optical or acoustic measurement signal.

4. The diagnostic method according to claim 1, wherein the measurement signal is detected by a sensor directed towards the drive shaft or with a sensor directed towards the positioning shaft.

5. The diagnostic method according to claim 1, wherein the measurement signal is detected by a sensor directed towards a rotationally fixed connection that connects the drive shaft and the position shaft to each other in the rotationally fixed manner.

6. The diagnostic method according to claim 1, further comprising detecting, during the movement of the drive shaft, a time, a setpoint position signal, an electrical control signal and/or a second measurement signal related to a different physical variable than the measurement signal.

7. The diagnostic method according to claim 6, wherein the derivative of the measurement signal is related to the time or related to the other physical variable.

8. The diagnostic method according to claim 1, wherein, an amplitude of the rotational backlash is determined based on the measurement signal that is a position measurement signal, a velocity measurement signal or an acceleration measurement signal, the measurement signal being detected by a sensor directed towards the drive shaft or by a sensor directed towards the positioning shaft.

9. The diagnostic method according to claim 1, further comprising performing a partial stroke test or a full stroke test.

10. The diagnostic method according to claim 1, wherein the positioning device is a pneumatic or electric actuator.

11. The diagnostic method according to claim 1, wherein the positioning armature is an actuator valve.

12. The diagnostic method according to claim 1, wherein the drive shaft and the positioning shaft are connected to each other by a detachable coupling interface and/or a positive-locking torque coupling.

13. A positioning device for a process plant, comprising:
   an actuator including a drive shaft;
   a positioning armature including a positioning shaft;
   a rotationally fixed connection configured to connect the drive shaft and the positioning shaft to each other; and
   a detector including a sensor and diagnostic electronics connected to the sensor, the diagnostic electronics being configured to:
      receive a measurement signal from the sensor, determine if the measurement signal exceeds a predetermined threshold value, generate a warning signal based on the determination, and evaluate the measurement signal or a derivative of the measurement signal for a step-like change to detect a rotational backlash.

14. The positioning device according to claim 13, wherein the sensor is directed towards the drive shaft, towards the positioning shaft, or towards the rotationally fixed connection.

15. The positioning device according to claim 13, wherein the sensor is a pressure sensor, a position sensor, a speed sensor and/or an acceleration sensor, the sensor being directed towards the positioning shaft or towards the drive shaft, wherein the diagnostic electronics is configured to determine an amplitude of the rotational backlash based on the measurement signal generated by the sensor.

16. The positioning device according to claim 13, wherein the sensor is a pressure sensor, a position sensor, a speed sensor, a force sensor, a torque sensor, an acceleration sensor, an optical sensor and/or an acoustic sensor.

17. The positioning device according to claim 13, the detector further comprising:

a second sensor connected to the diagnostic electronics and configured to measure a different physical variable than the sensor; and/or a device connected to the diagnostic electronics and configured to detect a setpoint position signal or an electrical control signal.

18. The positioning device according to claim 17, wherein the diagnostic electronics is further configured determine the derivative of the first measurement signal with respect to the other physical variable or time.

19. The positioning device according to claim 17, wherein the sensor is a pressure sensor configured to sense a pressure configured to sense a pneumatic drive pressure in a working chamber of the actuator, and the second sensor is a position sensor configured to sense a position of the drive shaft.

* * * * *